United States Patent
Rai et al.

(10) Patent No.: US 9,973,951 B1
(45) Date of Patent: May 15, 2018

(54) USE OF UE-CAPABILITY REPORTING TO CONTROL UE SERVICE

(71) Applicant: Sprint Spectrum L.P., Overland Park, KS (US)

(72) Inventors: Deveshkumar N. Rai, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 159 days.

(21) Appl. No.: 15/184,162

(22) Filed: Jun. 16, 2016

(51) Int. Cl.
| | |
|---|---|
| *H04W 36/00* | (2009.01) |
| *H04W 24/08* | (2009.01) |
| *H04W 8/22* | (2009.01) |
| *H04W 36/36* | (2009.01) |
| *H04W 40/22* | (2009.01) |
| *H04W 88/16* | (2009.01) |

(52) U.S. Cl.
CPC ............ *H04W 24/08* (2013.01); *H04W 8/22* (2013.01); *H04W 36/0061* (2013.01); *H04W 36/36* (2013.01); *H04W 40/22* (2013.01); *H04W 88/16* (2013.01)

(58) Field of Classification Search
CPC .............................. H04W 36/00; H04W 24/08
See application file for complete search history.

(56) References Cited

U.S. PATENT DOCUMENTS

| | | | |
|---|---|---|---|
| 2014/0226613 A1* | 8/2014 | Kim | ...................... H04L 1/1812 370/329 |
| 2016/0150572 A1* | 5/2016 | Quan | .................... H04L 1/1607 370/329 |

* cited by examiner

*Primary Examiner* — Kamran Afshar
*Assistant Examiner* — Farideh Madani (57) ABSTRACT

A method and system that uses user-equipment (UE) capability reporting to control UE service. A UE provides its serving base station with an initial capabilities report indicating that the UE does not support determining and reporting when neighboring coverage is threshold strong, and so the base station does not yet provision the UE with a measurement event including a threshold to facilitate such determining and reporting. When the UE then determines that its serving coverage is threshold weak, the UE then transmits to its serving base station an updated capabilities report indicating that the UE does support such determining and reporting, and so the base station then provisions the UE with threshold (e.g., provisions the UE with a measurement event causing the UE to compare measured neighbor coverage strength with such a threshold).

20 Claims, 6 Drawing Sheets

USE OF UE-CAPABILITY REPORTING TO CONTROL UE SERVICE

BACKGROUND

A typical wireless communication system includes one or more base stations, each radiating to define one or more coverage areas, such as cells and cell sectors, in which user equipment devices (UEs) such as cell phones, tablet computers, tracking devices, embedded wireless modules, and other wirelessly equipped devices (whether or not user-operated) can operate. Further, each base station of the system may then be coupled or communicatively linked with network infrastructure such as a switch and/or a gateway that provides connectivity with one or more transport networks, such as the public switched telephone network (PSTN) and/or the Internet for instance. With this arrangement, a UE within coverage of the system may thus engage in air interface communication with a base station and thereby communicate via the base station with various remote network entities or with other UEs served by the system.

In general, a wireless communication system may operate in accordance with a particular air interface protocol or radio access technology (RAT), with communications from a base station to UEs defining a downlink or forward link and communications from the UEs to the base station defining an uplink or reverse link. Examples of existing air interface protocols include, without limitation, Orthogonal Frequency Division Multiple Access (OFDMA) (e.g., Long Term Evolution (LTE) or Wireless Interoperability for Microwave Access (WiMAX)), Code Division Multiple Access (CDMA) (e.g., 1xRTT and 1xEV-DO), Global System for Mobile Communication (GSM), WI-FI, and BLUETOOTH. Each protocol may define its own procedures for registration of WCDs, initiation of communications, handover between coverage areas, and functions related to air interface communication.

In accordance with the air interface protocol, each of the one or more coverage areas of such a system may operate on one or more carrier frequencies and may define a number of air interface channels for carrying information between the base station and UEs. By way of example, each coverage area may define a pilot channel, reference channel or other resource on which the base station may broadcast a pilot signal, reference signal, or the like that UEs may detect as an indication of coverage and may measure to evaluate coverage. Further, each coverage area may define a downlink control channel for carrying scheduling directives and other control signaling from the base station to UEs, and an uplink control channel for carrying service requests and other control signaling from UEs to the base station, and each coverage area may define downlink and uplink traffic channels or the like for carrying bearer traffic between the base station and UEs.

When a UE initially enters into coverage of a wireless communication system (e.g., powers on in coverage of the system), the UE may detect a reference signal and read system information broadcast from a base station and may engage in a process to register itself to be served by the base station and generally by the system. For instance, the UE and base station may first engage in signaling to establish a radio-link-layer connection between the UE and the base station, the UE may then transmit an attach request message on an uplink control channel to the base station, and the base station and/or supporting infrastructure may then responsively authenticate and authorize the UE for service, establish a record indicating where in the system the UE is operating, establish local profile or context records for the UE, and provide an attach accept message to the UE.

Thereafter, the UE may then be served by the system in an idle mode or a connected/active mode. In the idle mode, the UE may monitor a downlink control channel to detect page messages and other information regarding incoming communications and may similarly transmit uplink control signaling to initiate communications or for other reasons. In the connected/active mode, the UE may have particular traffic channel resources assigned by the UE, which the UE may use to engage in communication of bearer traffic and the like.

OVERVIEW

When a UE is served in a base station's coverage area, the UE may monitor the reference signal in that coverage area and the reference signal in other coverage areas of the system, in an effort to ensure that the UE operates in an appropriate coverage area. For instance, the UE may be configured to detect when the reference signal in its serving coverage area is threshold weak (e.g., having a signal strength or signal-to-noise ratio lower than a defined threshold) and the reference signal in a neighboring coverage area is threshold strong (e.g., having a signal strength or signal-to-noise ratio higher than a threshold) and to responsively notify its serving base station In response, the base station and/or supporting infrastructure may then work to hand over the UE to be served in the neighboring coverage area instead.

To facilitate this, the UE's serving base station may provision the UE with certain measurement events defining reference-signal threshold levels at which the UE should transmit a measurement report to the base station. In some networks, these are referred to as "A" events.

For example, when a UE first attaches with or hands over to a base station, the base station could provision the UE with measurement events that will cause the UE to measure both its serving coverage strength and neighboring coverage strength, as a basis to trigger reporting by and possible handover. For instance, the base station could provision the UE with an "A3" event that specifies neighboring coverage being at least a threshold offset stronger than the serving coverage, and/or an "A5" event that specifies serving coverage being weaker than a threshold and neighboring coverage being stronger than another threshold. Pursuant to these events, the UE could thus periodically measure its serving coverage strength and scan for and measure neighboring coverage strength. And when the UE detects that either of these events occurs, the UE could then generate and transmit to its serving base station a measurement report specifying which event occurred with respect to which detected neighboring coverage, and the base station could responsively process handover of the UE to that neighboring coverage.

As another example, if the base station determines that it should force handover of the UE away from the UE's serving coverage area, perhaps due to overload of the coverage area or other reasons, the base station could then provision the UE with an "A4" event that specifies neighboring coverage being stronger than a threshold (regardless of serving coverage strength). Pursuant to that event, the UE could thus periodically scan for and measure neighboring coverage strength. And when the UE detects threshold strong neighboring coverage per the event, the UE could then generate and transmit to its serving base station a measurement a measurement report specifying the detected neighboring coverage, and the base station could responsively process handover of the UE to that neighboring coverage.

Although this process may work well for a typical UE, there may be certain UEs or situations where the process could pose issues. By way of example, if a UE engages in a type of communication that should not be interrupted, it may be best if the UE does not engage in handover from its serving coverage to neighboring coverage, as such handover could interrupt the UE's communication. A specific example of such a UE is one that functions to provide connectivity for one or more other UEs. For instance, a UE could be operating with mobile-hotspot service with one or more connected end-user devices such as computers or the like, in which case it may be beneficial for the UE to not engage in handover or take other action that would interrupt its connection, as such an interruption could impact service of the end-user devices. Similarly, a UE could be integrated or linked with a relay base station, and the UE could thus function to provide wireless backhaul connectivity for devices served by the relay base station, in which case it would likewise be beneficial for the UE to not engage in handover or take other action that would interrupt its connection, as such an interruption could impact service of the relay-served devices.

Accordingly, it may be best for UEs in these or other situations to not measure and report neighboring coverage, so as to avoid having such a reports lead to handover of the UEs. On the other hand, however, if such a UE's serving coverage becomes sufficiently weak, it may then be desirable for the UE to measure and report neighboring coverage so as to possibly trigger handover from the weak serving coverage to sufficiently strong neighboring coverage.

The present disclosure provides a mechanism to facilitate such operation, by leveraging UE capability information.

In accordance with the disclosure, a UE will transmit by default to its serving base station a UE-capabilities report that indicates the UE is not capable of determining and reporting when neighboring coverage is threshold strong (e.g., when neighboring coverage strength is at least a threshold level and/or when neighboring coverage strength is at least a threshold extent greater than serving coverage strength). And in response to this capabilities report, the base station will therefore not provide the UE with a threshold with which to compare neighboring coverage (e.g., a threshold offset from serving coverage, or a standalone threshold level) and thus the UE will not receive such a threshold from the base station. For instance, the base station will not provision the UE with A3, A4, and A5 thresholds. Thus, by default, the UE will not be set to determine and report when neighboring coverage is threshold strong, and so the base station would not receive such a report from the UE and would not process handover of the UE to neighboring coverage on that basis.

Further, however, the UE could still monitor strength of its serving coverage, perhaps pursuant to a measurement event, or as a regular matter to facilitate service by its serving base station. And if and when the UE detects that its serving coverage is threshold weak, the UE will then transmit to its serving base station an updated UE-capabilities report, indicating that the UE does support determining and reporting when neighboring coverage is threshold strong.

In response to this updated UE-capabilities report, the base station will then provide the UE with at least one threshold with which to compare neighboring coverage (e.g., a threshold offset from serving coverage and/or a standalone threshold level), and thus the UE will receive such a threshold. The UE will thus become set to scan for neighboring coverage to determine when neighboring coverage is threshold strong (e.g., threshold stronger than a specified offset from the serving coverage, or threshold stronger than a specified standalone threshold) and, upon detecting such an event, will report to the base station to facilitate possible handover to the detected neighboring coverage.

Using UE-capability reporting in this manner could thus beneficially trick the serving base station into perceiving that the UE does not support measuring and reporting neighboring coverage, even though the UE is capable of doing so, and the base station would thus not provision the UE to engage in such measurement and reporting, thereby helping to prevent the UE from handing over to neighboring coverage. In turn, the updated UE-capabilities report sent when the UE's serving coverage is threshold weak, and when the UE could benefit from handover to neighboring coverage, could then revise the base station's perception, causing the base station to then provision the UE to engage in such measurement and reporting, so as to facilitate possible handover.

Accordingly, in one respect, disclosed is a method for controlling operation of a UE. The method includes the UE engaging in signaling with a base station to establish a radio-link-layer connection between the UE and the base station, where the UE is served by the base station via an air interface. And the method then includes, while being served by the base station via the air interface, the UE transmitting to the base station an initial UE-capabilities report indicating that the UE does not support determining and reporting to the base station when neighboring coverage is threshold strong. And in response to the initial UE-capabilities report indicating that the UE does not support determining and reporting to the base station when neighboring coverage is threshold strong, the UE does not yet receive from the base station a threshold with which to compare neighboring coverage strength.

And in turn, the method includes, while the UE then continues to be served by the base station via the air interface, the UE detecting that coverage of the base station is threshold weak and, responsive to the detecting, the UE (i) transmitting to the base station an updated UE-capabilities report indicating that the UE does support determining and reporting to the base station when neighboring coverage is threshold strong, (ii) receiving from the base station, in response to the updated UE-capabilities report indicating that the UE does support determining and reporting to the base station when neighboring coverage is threshold strong, the threshold with which to compare neighboring coverages strength, and (iii) determining and reporting to the base station when neighboring coverage is stronger than the received threshold.

In another respect, disclosed is a method for controlling base station service of a UE along the same lines. The method includes configuring a radio-link-layer connection between the base station and the UE, where the base station serves the UE via an air interface. Further, the method includes, while the base station is serving the UE via the air interface, (i) the base station receiving an initial UE-capability report specifying that the UE does not support determining and reporting to base station when neighboring coverage is threshold strong, and (ii) responsive to the received initial UE-capability report specifying that the UE does not support determining and reporting to base station when neighboring coverage is threshold strong, the base station not yet provisioning the UE with a threshold with which to compare neighboring coverage strength.

In turn, the method includes, while the base station is still serving the UE via the air interface, (i) the base station receiving an updated UE-capability report specifying that the UE supports determining and reporting to the base station when neighboring coverage is threshold strong, where the updated UE-capability is generated by the UE in response to the UE detecting threshold weak coverage from the base station, and (ii) responsive to the received updated capability report specifying that the UE supports determining and reporting to base station when neighboring coverage is threshold strong, the base station provisioning the UE with the threshold with which to compare neighboring coverage.

Still further, in another respect, disclosed is a method that could be implemented by a wireless service provider or the like that would operate (e.g., partly or fully control operation of) a base station and provide (e.g., sell, lease, or otherwise convey to end-users) UEs that would be served by the base station. The method thus includes operating a base station configured to serve user UEs, and providing a UE configured to be served by the base station.

In accordance with the method, the base station and UE are configured to engage in signaling with each other to establish a radio-link-layer connection through which the base station will serve the UE. Further, the UE is configured to transmit to the base station an initial UE-capabilities report indicating that the UE does not support determining and reporting to the base station when neighboring coverage is threshold strong. And in response to the initial UE-capabilities report indicating that that the UE does not support determining and reporting to the base station when neighboring coverage is threshold strong, the base station does not yet provision the UE with a threshold with which to compare neighboring coverage.

Further in accordance with the method, the UE is configured to detect when coverage of the base station is threshold weak and, responsive to detecting when coverage of the base station is threshold weak, to transmit to the base station an updated UE-capabilities report indicating that the UE does support determining and reporting to the base station when neighboring coverage is threshold strong. And the base station is configured to respond to the updated UE-capabilities report indicating that the UE does support determining and reporting to the base station when neighboring coverage is threshold strong by provisioning the UE with the threshold with which to compare neighboring coverage.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

Referring to the drawings, as noted above, FIG. 1 is a simplified block diagram of an example wireless communication system in which features of the present disclosure can be implemented. It should be understood that this and other arrangements and processes described herein are set forth for purposes of example only, and that other arrangements and elements (e.g., machines, interfaces, functions, orders of elements, etc.) can be added or used instead and some elements may be omitted altogether. In addition, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processing units programmed to execute computer instructions for instance.

Figure 1:
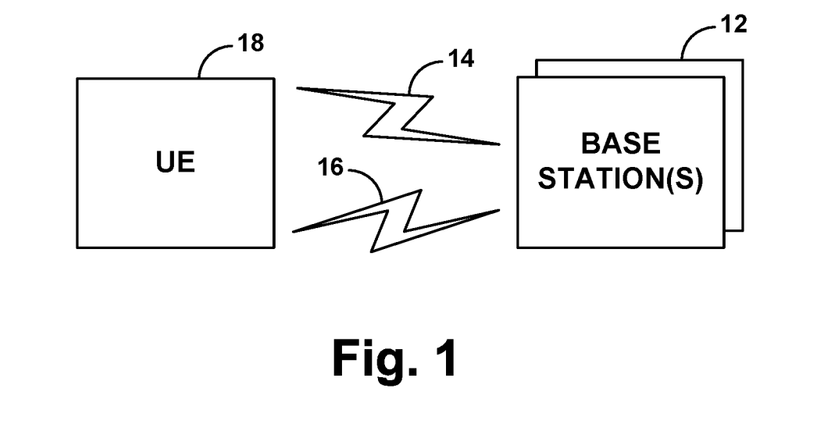
FIG. 1 is a simplified block diagram of an example wireless communication system in which features of the present disclosure can be implemented.

The system of FIG. 1 includes one or more example base stations 12 providing two example wireless coverage areas 14, 16 at a location where a representative UE 18 is positioned. Coverage areas 14 and 16 could both be provided by a single base station or could be provided by separate base stations, and could differ from each other in various ways, such as by operating on different carrier frequencies than each other, providing coverage at different physical locations than each other, and/or providing coverage using different air interface protocols than each other. In any event, however, the two coverage areas are considered to be neighbors, in that they overlap each other partly or fully and thus a UE such as UE 18 could potentially hand over from one coverage area to the other.

With this arrangement, the UE may be served in coverage area 14 rather than coverage area 16. In particular, the UE may be attached via coverage area 14 with a serving base station and have a radio-link-layer connection with that base station. Per the present disclosure, the UE would initially provide its serving base station with a UE-capability report that would indicate the UE is not capable of (does not support) determining and reporting when neighboring coverage is threshold strong. And so the serving base station would not provision the UE with a threshold to facilitate such determining and reporting, and the UE would therefore not determine and report when coverage area 16 is threshold strong, thus avoiding handover of the UE on that basis.

In turn, the UE would then detect that its serving coverage strength is threshold weak and would responsively provide its serving base station with an updated UE-capability report that would indicate the UE is capable (does support) determining and reporting when neighboring coverage is threshold strong. And the serving base station would responsively provision the UE with a threshold to facilitate such determining and reporting, and so the UE would then scan for such neighboring coverage and possibly determine and report that coverage area 16 is threshold strong, thus facilitating handover of the UE on that basis from coverage area 14 to coverage area 16.

The present method and system will now be described by way of example primarily in the context of an LTE network.

However, it will be understood that the disclosed principles could extend to apply in various other types of networks as well. Further, even within the context of LTE, numerous variations from the details disclosed are possible as well.

Figure 2:
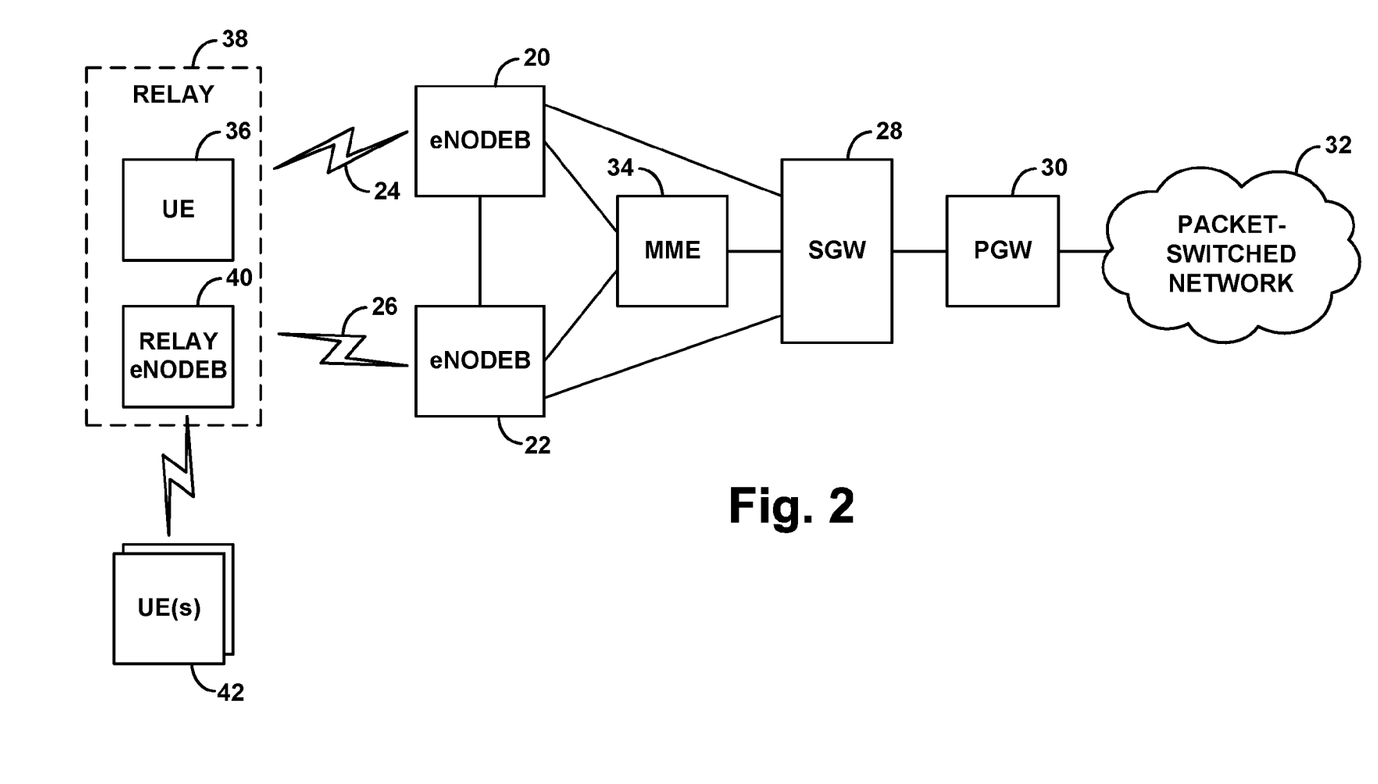
FIG. 2 is a simplified block diagram of an example LTE network in which features of the present disclosure can be implemented.

FIG. 2 is a simplified block diagram of a representative LTE network. As shown in FIG. 2, the LTE network includes two representative LTE base stations (evolved Node Bs (eNodeBs)) 20, 22, each of which radiates to provide a respective LTE cell 24, 26, with a communication interface between the eNodeBs. These eNodeBs could have various form factors, such as being macro eNodeBs that provide widespread coverage, or small cell eNodeBs (e.g., femtocells, relay eNodeBs, or the like) that provide more limited coverage. In practice, the eNodeBs could be integrated together, such as by using a shared antenna structure and associated equipment, or the eNodeBs could be physically separate from each other. In line with the discussion above, the cells provided by these eNodeBs could differ from each other in various ways, such as by being on different carrier frequencies and/or being in different physical locations for instance, but still neighboring each other.

As further shown, the LTE network includes a serving gateway (SGW) 28 having a communication interface with each eNodeB, and a packet data network gateway (PGW) 30 having a communication interface with the SGW and providing connectivity with a packet-switched transport network 32 such as the Internet for instance. Further, the LTE network includes a mobility management entity (MME) 34 having a communication interface with each eNodeB and a communication interface with the SGW.

In practice, the various illustrated nodes of the LTE network may each sit as nodes on a core packet-switched network operated by a wireless service provider, and thus the communication interfaces between the nodes could be logical interfaces or tunnels established in that core network. As such, each illustrated node may have a respective Internet Protocol (IP) address on the core network, so that the nodes can communicate with each other using their respective IP addresses.

In the arrangement of FIG. 2, a representative UE 36 is shown being served by eNodeB 20 in cell 24, and thus with eNodeB 20 serving the UE over an air interface of cell 24. The illustrated UE 36 is shown as a component of a relay 38 that also includes a relay eNodeB 40, with relay eNodeB 40 then serving UEs 42. This arrangement serves as just one example of where it could be beneficial to avoid UE handover, as, here, the process of handing over UE 36 from eNodeB 20 to eNodeB 22 could interrupt service to the UEs 42 served by relay eNodeB 40, which could result in undesirable user experience issues.

When UE 36 first enters into coverage of cell 24, the UE may initially attach with and be served by eNodeB 20 in cell 20. In particular, the UE may detect coverage of cell 24 and may responsively engage in air interface access-channel signaling with eNodeB 20, triggering the establishment of signaling radio bearers (SRBs) over which the UE can then engage in Radio Resource Control (RRC) connection signaling with the eNodeB to establish an RRC connection (a type of radio-link-layer connection) between the UE and the eNodeB. Once the UE has an established RRC connection with the eNodeB, the UE may then transmit to the eNodeB, over an SRB, an attach request, which the eNodeB may forward to the MME for processing. Upon authenticating and authorizing the UE for service, the MME may then engage in signaling with the SGW and eNodeB to establish for the UE of one or more access bearers between the eNodeB and the PGW for carrying data between the UE and the transport network 32. And the MME may then transmit to the eNodeB (in an initial context setup request message) an attach accept message, which the eNodeB forward to the UE. With UE thus attached, the eNodeB may then maintain a context record for the UE and allocate air interface resources of cell 24 as necessary to carry data to and from the UE.

As a last step of this attachment process, the eNodeB could also transmit to the UE an RRC message carrying a UE-capability enquiry, and the UE could respond to the eNodeB with a "UE capability information" information element (IE). This UE capability information IE comprises a set of feature group indicator (FGI) bits, each mapped to a particular capability, and each having a value (0 or 1) indicating whether or not the UE has that capability. The UE and eNodeB are each configured to understand these bits and their mappings, so that the UE transmitting the FGI bits to the eNodeB functions to inform the eNodeB what capabilities the UE has and does not have. Further, the UE capability information IE that the UE transmits to the eNodeB in this process could constitute the UE's initial report of its capabilities.

At least two FGI bits in a version of LTE, namely, bits 14 and 16, could be leveraged to facilitate the presently disclosed process. Bit 14 specifies whether the UE supports event measurement reports A4 and A5 as described above. By setting bit 14 to zero in its initial UE capability information IE to the eNodeB, the UE could indicate that it does not support determining and measuring neighboring coverage per events A4 and A5, and the eNodeB could therefore forgo provisioning the UE with measurement events A4 and A5. Bit 16 specifies whether the UE supports periodic measurements to determine its strongest cell, including possibly intra-frequency, inter-frequency, and inter-RAT. By setting bit 16 to zero in its initial UE capability information IE to the eNodeB, the UE could indicate that it does not support performing periodic measurements for a strongest cell, and the eNodeB could responsively forgo provisioning the UE with any measurement events that would involve such measuring and associated reporting, including perhaps the A3, A4, and A5 events discussed above.

Thus, at this stage, the UE would be served by the eNodeB and would not be provisioned to determine and report to the base station when neighboring coverage is threshold strong. Advantageously, this process could thus help reduce the likelihood that the UE would detect and report a sufficiently strong neighboring coverage area and thus trigger handover of the UE to that neighboring coverage area, thereby possibly resulting in an undesirable interruption of connectivity as discussed above.

In a specific example implementation of this process, where the UE provides wireless backhaul connectivity for a relay 38 as shown in FIG. 2 for instance, the UE could use aspects of the relay service as a basis to decide that the UE's initial capabilities report should indicate that that the UE does not support determining and reporting to the base station when neighboring coverage is threshold strong. For instance, the UE could provide such an initial UE-capabilities report due to the fact that the UE is connected with the relay base station 40 and is thus providing wireless backhaul connectivity for the relay 38. Further, the UE could learn (perhaps through signaling between the UE and the relay base station 40) how many UEs 42 the relay base station 40 is serving and/or what priority level that service is, and based on the relay base station serving a threshold number of UEs 42 and/or threshold high priority service, the UE could decide to provide as its initial UE-capability report an indication that the UE does not support determining and reporting to the base station when neighboring coverage is threshold strong. In practice, here, the initial UE-capabilities report could be provided later than the attachment process, at some point after the UE is already in operation and the relay base station is already serving one or more UEs 42.

Per the present process, however, the UE could still regularly monitor strength of coverage of cell 24, such as by evaluating the RSRP or RSRQ of the reference signal from base station 20 for cell 24 and/or considering other such metrics indicative of strength of the serving cell. And when the UE detects that the serving cell is threshold weak (e.g., that one or more measurements of the serving cell strength are below a threshold level indicating weak coverage), the UE could then responsively provide eNodeB 20 with an updated UE capability report to now indicate that the UE is capable of determining and reporting when neighboring coverage strength is threshold high.

The UE could provide this updated UE capability report as an updated string of FGI bits, in a new UE capability information IE. By way of example, the UE could transmit to the eNodeB a tracking area update (TAU) message that carries such an updated UE capability information IE, and the eNodeB could read the updated UE capability information IE from that message, or the UE could send such a message via the eNodeB to the MME, and the MME could extract and send to the eNodeB the contained UE capability information IE. Alternatively, the UE could transmit to the eNodeB an RRC message to which the eNodeB responds by transmitting to the UE a new UE-capability enquiry, to which the UE could then respond by transmitting the updated UE capability information IE. And still alternatively, other messaging could be defined to carry the updated UE capability information IE.

Using FGI bits as the example mechanism for conveying UE capability information, if the UE had set bit 14 and bit 16 to zero in its initial UE capability information IE, the UE could now set bit 14 and 16 to one in its updated UE capability information IE, so as to now inform the eNodeB that the UE supports A4 and A5 measurement reporting and periodic measurement for a strongest cell.

Upon receipt of the updated UE capability information IE, the eNodeB would thus determine that the UE supports determining and reporting when neighboring coverage is threshold strong. And given this UE capability, the eNodeB would then responsively provision the UE with one or more applicable measurement events defining one or more thresholds against which to compare neighboring coverage strength detected by the UE as discussed above. For instance, the eNodeB could transmit to the UE an RRC connection reconfiguration message that specifies the measurement event(s) with associated threshold(s), and the UE may read that message and responsively set itself to operate accordingly.

In addition, the eNodeB could also respond to the UE's updated capability report by providing to the UE, perhaps along with the one or more measurement events, an indication of measurement gaps (e.g., particular periodicity and/or other timing) when the UE should tune-away from eNodeB 20 to scan for and measure neighboring coverage. Thus, the UE could receive this measurement gap information as well and responsively set itself to tune-away and scan for and measure neighboring coverage accordingly.

Thus, at this stage, the UE may begin scanning for neighboring coverage and determining whether the neighboring coverage is threshold strong (e.g., stronger by an offset threshold than the coverage of cell 24, or stronger than a defined standalone threshold, possibly considering constants or other offset values as well). Through this process, the UE may thereby discover that cell 26 provided by base station 22 is threshold strong. And consequently, the UE may then transmit to its serving eNodeB 20 a measurement report indicating that fact, in response to which the eNodeB may then process a handover of the UE from cell 24 to cell 26 of base station 22.

Figure 3:
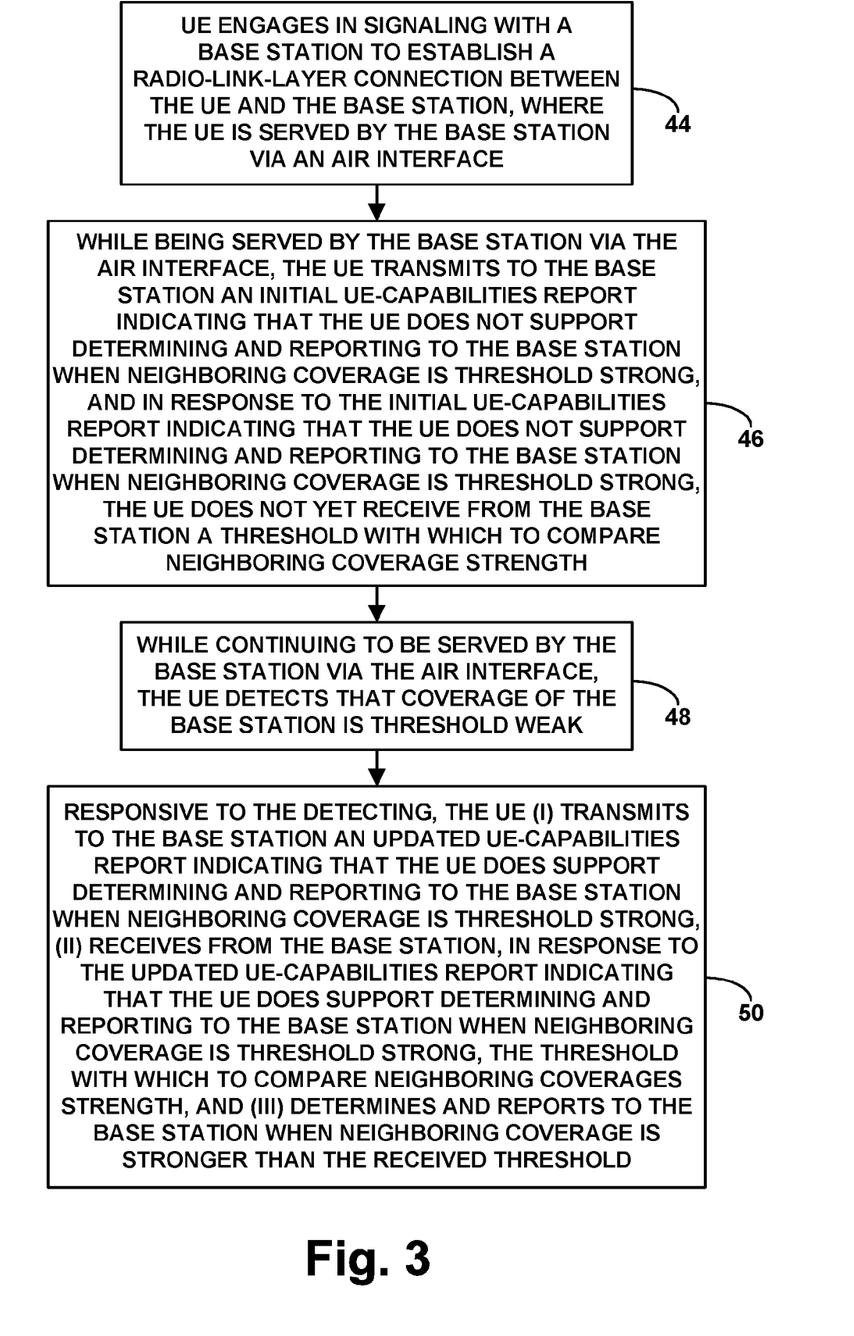
FIG. 3 is a flow chart depicting operations that can be carried out in accordance with the present disclosure.

FIG. 3 is next a flow chart depicting operations in line with the discussion above, to control operation of a UE. As shown in FIG. 3, at block 44, the UE engages in signaling with a base station to establish a radio-link-layer connection between the UE and the base station, where the UE is served by the base station via an air interface. At block 46, while being served by the base station via the air interface, the UE transmits to the base station an initial UE-capabilities report indicating that the UE does not support determining and reporting to the base station when neighboring coverage is threshold strong, and in response to the initial UE-capabilities report indicating that the UE does not support determining and reporting to the base station when neighboring coverage is threshold strong, the UE does not yet receive from the base station a threshold with which to compare neighboring coverage strength.

In turn, at block 48, while continuing to be served by the base station via the air interface, the UE detects that coverage of the base station is threshold weak. And at block 50, responsive to the detecting, the UE (i) transmits to the base station an updated UE-capabilities report indicating that the UE does support determining and reporting to the base station when neighboring coverage is threshold strong, (ii) receives from the base station, in response to the updated UE-capabilities report indicating that the UE does support determining and reporting to the base station when neighboring coverage is threshold strong, the threshold with which to compare neighboring coverages strength, and (iii) determines and reports to the base station when neighboring coverage is stronger than the received threshold.

In this method, the act transmitting the initial UE-capabilities report to the base station could occur in association with an attach process, as discussed above for instance, where the UE receives from the base station an attach accept message and the UE then receives from the base station a UE-capability enquiry to which the UE responds with the initial UE-capabilities report.

Further, the initial UE-capabilities report could include a plurality of FGI bits in which a particular FGI bit has a first value indicating that the UE does not support determining and reporting to the base station when neighboring coverage is threshold strong, and the updated UE-capabilities report could include an update of at least some of the plurality of the FGI bits in which the particular FGI bit has a second value indicating that the UE supports determining and reporting to the base station when neighboring coverage is threshold strong. Moreover, the act of indicating that the UE does not support determining and reporting to the base station when neighboring coverage is threshold strong could involve indicating that the UE does not support event measurement reporting for one or more events selected from the group consisting of A3, A4 and A5, and the act of indicating that the UE supports determining and reporting to the base station when neighboring coverage is threshold strong could involve indicating that the UE supports event measurement reporting for the one or more events.

In addition, as discussed above, the UE at issue could provide wireless backhaul connectivity for a relay, in which case a basis for the UE transmitting the initial UE capabilities report indicating that the UE does not support determining and reporting to the base station when neighboring coverage is threshold strong could be based at least in part on the UE providing wireless backhaul connectivity for the relay. And the act of transmitting the initial UE capabilities report indicating that the UE does not support determining and reporting to the base station when neighboring coverage is threshold strong could help prevent the UE from handing over to a neighboring base station.

Further, the act of transmitting of the initial UE capabilities report indicating that the UE does not support determining and reporting to the base station when neighboring coverage is threshold strong could be based further on a determination that the relay for which the UE provides wireless backhaul connectivity is serving at least a threshold extent of communication, including for instance that the relay is serving at least a threshold quantity of UEs with communication and/or that the relay is serving communication of a particular defined priority level.

In addition, as discussed above, the method could also include, in response to the updated UE-capabilities report indicating that the UE does support determining and reporting to the base station when neighboring coverage is threshold strong, the UE receiving measurement gap information defining when the UE will tune away from the base station to measure neighboring coverage, and the UE accordingly tuning away from the base station as indicated to measure neighboring coverage.

Still further, the act of determining and reporting to the base station when neighboring coverage is stronger than the received threshold could take various forms. For instance, it could involve determining strength of a neighboring coverage pilot signal, where the strength comprises RSRP and/or RSRQ, comparing at least the determined strength with the received threshold and thereby determining that the neighboring coverage is threshold strong, and transmitting to the base station a measurement report indicating that the neighboring coverage is threshold strong. And as noted above, the comparison could be with a standalone threshold and/or with a threshold offset from the serving coverage strength, possibly considering one or more other or alternative metrics as well.

Figure 4:
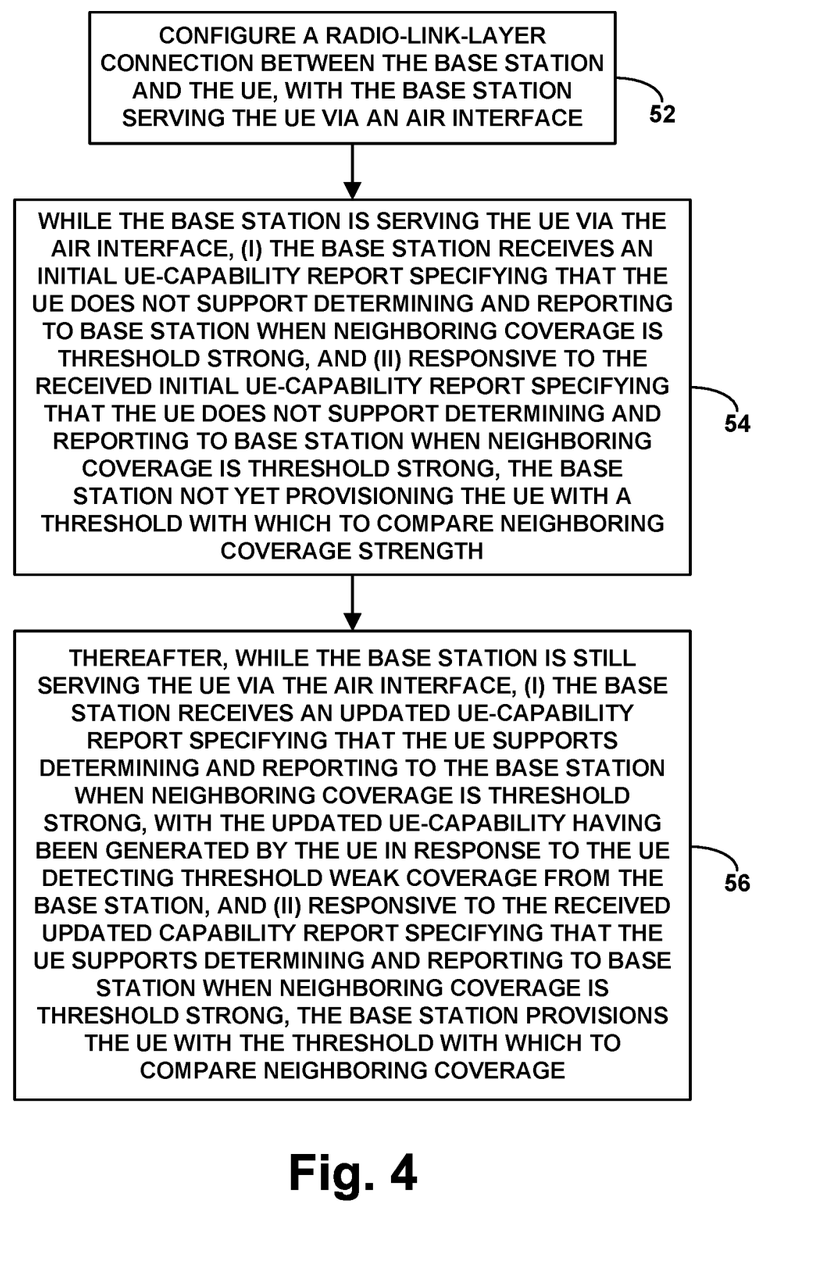
FIG. 4 is another flow chart depicting operations that can be carried out in accordance with the present disclosure.

FIG. 4 is next another flow chart depicting operations in line with the discussion above, to control service of a UE. As shown in FIG. 4, at block 52, the method involves configuring a radio-link-layer connection between the base station and the UE, with the base station serving the UE via an air interface. And at block 54, while the base station is serving the UE via the air interface, the method includes (i) the base station receiving an initial UE-capability report specifying that the UE does not support determining and reporting to base station when neighboring coverage is threshold strong, and (ii) responsive to the received initial UE-capability report specifying that the UE does not support determining and reporting to base station when neighboring coverage is threshold strong, the base station not yet provisioning the UE with a threshold with which to compare neighboring coverage strength.

Further, at block 56, the method involves, thereafter while the base station is still serving the UE via the air interface, (i) the base station receiving an updated UE-capability report specifying that the UE supports determining and reporting to the base station when neighboring coverage is threshold strong, with the updated UE-capability having been generated by the UE in response to the UE detecting threshold weak coverage from the base station, and (ii) responsive to the received updated capability report specifying that the UE supports determining and reporting to base station when neighboring coverage is threshold strong, the base station provisioning the UE with the threshold with which to compare neighboring coverage.

Other features as discussed above can apply here as well. For instance, the initial UE-capabilities report could be received in association with an attach process, the UE-capabilities reports could indicate UE capabilities with FGI bits, the UE capabilities could be with respect to measurement events such as A3, A4, and A5, and the base station could provision the UE with measurement gap information as well. Further, the base station could store in a context record for the UE an indication of whether or not the UE supports measuring and reporting to the base station when neighboring coverage is threshold strong, in accordance with the UE's transmitted capability reports.

As further discussed above, a method in line with the present disclosure could include operations that could be carried out by a service provider or the like, for instance. For instance, the method could include operating a base station configured to serve UEs, and providing a UE configured to be served by the base station, such as one that could subscribe to service of the type provided by the service provider and the base station. In this method, the base station and UE could be configured in particular ways to facilitate operations as discussed above.

For instance, the base station and UE could be configured to engage in signaling with each other to establish a radio-link-layer connection, where the base station will serve the UE via an air interface. Further, the UE could be configured to transmit to the base station an initial UE-capabilities report indicating that the UE does not support determining and reporting to the base station when neighboring coverage is threshold strong, where, in response to the initial UE-capabilities report indicating that that the UE does not support determining and reporting to the base station when neighboring coverage is threshold strong, the base station does not yet provision the UE with a threshold with which to compare neighboring coverage.

Still further, the UE could be further configured to detect when coverage of the base station is threshold weak and, responsive to detecting when coverage of the base station is threshold weak, to transmit to the base station an updated UE-capabilities report indicating that the UE does support determining and reporting to the base station when neighboring coverage is threshold strong. And the base station could be further configured to respond to the updated UE-capabilities report indicating that the UE does support determining and reporting to the base station when neighboring coverage is threshold strong by provisioning the UE with the threshold with which to compare neighboring coverage. Yet further, the UE and base station could be configured to support various other features as discussed above.

Figure 5:
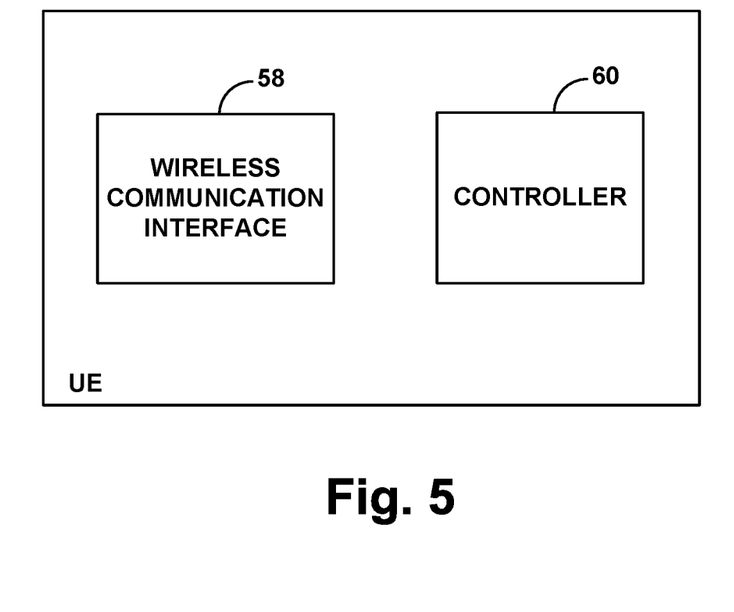
FIG. 5 is a simplified block diagram of an example WCD operable in accordance with the present disclosure.

FIG. 5 is next a simplified block diagram of an example UE operable in accordance with this disclosure. As shown, the example UE includes various example components such as a wireless communication interface 58 and a controller 60, which could be communicatively linked together by a system bus or other connection mechanism. Wireless communication interface 58 may include a radio-frequency transceiver, power amplifier, and antenna structure, cooperatively configured to facilitate air interface communication as discussed above. And controller 60 could include a processing unit (e.g., microprocessor, application specific integrated circuit, etc.), non-transitory data storage (e.g., one or more volatile and/or non-volatile storage components), and program instructions stored in the data storage and executable by the processing unit to carry out various UE operations described herein.

Figure 6:
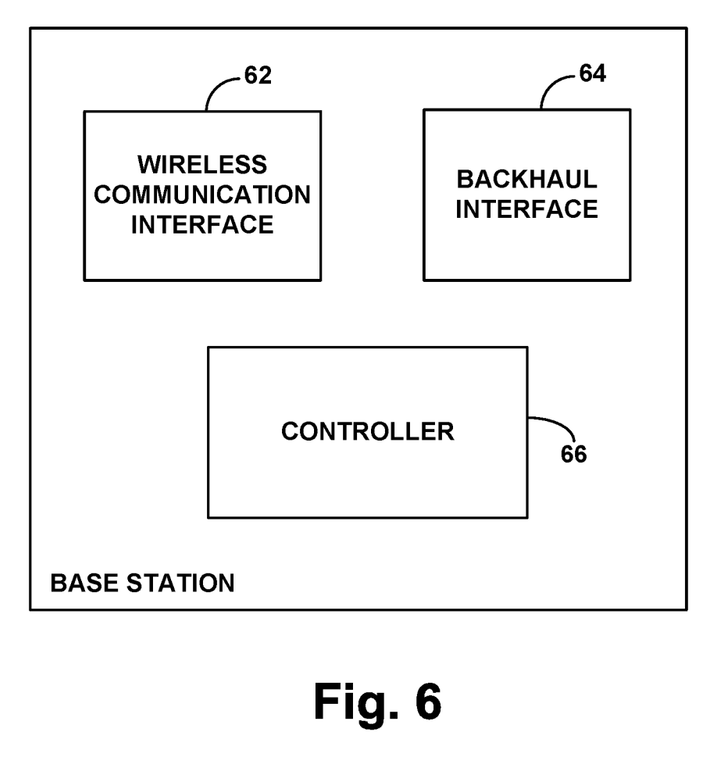
FIG. 6 is a simplified block diagram of an example base station operable in accordance with the disclosure.

Finally, FIG. 6 is simplified block diagram of an example base station operable in accordance with this disclosure. As shown, the example base station includes a wireless communication interface 62 through which to engage in air interface communication with UEs served by the base station, a backhaul communication interface 64 through which to engage in communication with other base stations and with various network infrastructure, and a controller 66 (e.g., a processing unit, non-transitory data storage, and program instructions executable by the processing unit) configured to cause the base station to carry out various base station operations described herein.

Exemplary embodiments have been described above. Those skilled in the art will understand, however, that changes and modifications may be made to these embodiments without departing from the true scope and spirit of the invention.

We claim:

1. A method for controlling operation of a user equipment device (UE), the method comprising:
engaging in signaling by the UE with a base station to establish a radio-link-layer connection between the UE and the base station, wherein the UE is served by the base station via an air interface;
while being served by the base station via the air interface, transmitting by the UE to the base station an initial UE-capabilities report indicating that the UE does not support determining and reporting to the base station when neighboring coverage is threshold strong, wherein in response to the initial UE-capabilities report indicating that the UE does not support determining and reporting to the base station when neighboring coverage is threshold strong, the UE does not yet receive from the base station a threshold with which to compare neighboring coverage strength; and
thereafter, while continuing to be served by the base station via the air interface, detecting by the UE that coverage of the base station is threshold weak and, responsive to the detecting, the UE (i) transmitting to the base station an updated UE-capabilities report indicating that the UE does support determining and reporting to the base station when neighboring coverage is threshold strong, (ii) receiving from the base station, in response to the updated UE-capabilities report indicating that the UE does support determining and reporting to the base station when neighboring coverage is threshold strong, the threshold with which to compare neighboring coverages strength, and (iii) determining and reporting to the base station when neighboring coverage is stronger than the received threshold.

2. The method of claim 1, wherein transmitting the initial UE-capabilities report to the base station occurs in association with an attach process, wherein the UE receives from the base station an attach accept message and the UE then receives from the base station a UE-capability enquiry to which the UE responds with the initial UE-capabilities report.

3. The method of claim 1,
wherein the initial UE-capabilities report comprises a plurality of feature-group-indicator (FGI) bits in which a particular FGI bit has a first value indicating that the UE does not support determining and reporting to the base station when neighboring coverage is threshold strong, and
wherein the updated UE-capabilities report comprises an update of at least some of the plurality of the FGI bits in which the particular FGI bit has a second value indicating that the UE supports determining and reporting to the base station when neighboring coverage is threshold strong.

4. The method of claim 1,
wherein indicating that the UE does not support determining and reporting to the base station when neighboring coverage is threshold strong comprises indicating that the UE does not support event measurement reporting for one or more events selected from the group consisting of A3, A4 and A5, and
wherein indicating that the UE supports determining and reporting to the base station when neighboring coverage is threshold strong comprises indicating that the UE supports event measurement reporting for the one or more events.

5. The method of claim 1, wherein the UE provides wireless backhaul connectivity for a relay, and wherein the transmitting of the initial UE capabilities report indicating that the UE does not support determining and reporting to the base station when neighboring coverage is threshold strong is based at least in part on the UE providing wireless backhaul connectivity for the relay,
whereby transmitting the initial UE capabilities report indicating that the UE does not support determining and reporting to the base station when neighboring coverage is threshold strong helps prevent the UE from handing over to a neighboring base station.

6. The method of claim 5, wherein the transmitting of the initial UE capabilities report indicating that the UE does not support determining and reporting to the base station when neighboring coverage is threshold strong is based further on a determination that the relay for which the UE provides wireless backhaul connectivity is serving at least a threshold extent of communication.

7. The method of claim 6, wherein the threshold extent of communication comprises at least an extent selected from the group consisting of (i) quantity of UEs served with communication and (ii) priority level of served communication.

8. The method of claim 1, further comprising receiving from the base station, in response to the updated UE-capabilities report indicating that the UE does support determining and reporting to the base station when neighboring coverage is threshold strong, measurement gap information defining when the UE will tune away from the base station to measure neighboring coverage.

9. The method of claim 1, wherein determining and reporting to the base station when neighboring coverage is stronger than the received threshold comprises:
determining strength of a neighboring coverage pilot signal, wherein the strength comprises at least one metric selected from the group consisting of reference signal receive power (RSRP) and reference signal receive quality (RSRQ);
comparing at least the determined strength with the received threshold and thereby determining that the neighboring coverage is threshold strong; and
transmitting to the base station a measurement report indicating that the neighboring coverage is threshold strong.

10. A method for controlling base station service of a user equipment device (UE), the method comprising, configuring a radio-link-layer connection between the base station and the UE, wherein the base station serves the UE via an air interface;

while the base station is serving the UE via the air interface, (i) receiving by the base station an initial UE-capability report specifying that the UE does not support determining and reporting to base station when neighboring coverage is threshold strong, and (ii) responsive to the received initial UE-capability report specifying that the UE does not support determining and reporting to base station when neighboring coverage is threshold strong, the base station not yet provisioning the UE with a threshold with which to compare neighboring coverage strength; and thereafter while the base station is still serving the UE via the air interface, (i) receiving by the base station an updated UE-capability report specifying that the UE supports determining and reporting to the base station when neighboring coverage is threshold strong, wherein the updated UE-capability is generated by the UE in response to the UE detecting threshold weak coverage from the base station, and (ii) responsive to the received updated capability report specifying that the UE supports determining and reporting to base station when neighboring coverage is threshold strong, the base station provisioning the UE with the threshold with which to compare neighboring coverage.

11. The method of claim 10, wherein receiving the initial UE-capabilities report from the base station occurs in association with an attach process, wherein the base station transmits to the UE an attach accept message and the base station then transmits to the UE a UE-capability enquiry in response to which the base station receives the initial UE-capabilities report.

12. The method of claim 10,
wherein the initial UE-capabilities report comprises a plurality of feature-group-indicator (FGI) bits in which a particular FGI bit has a first value indicating that the UE does not support determining and reporting to the base station when neighboring coverage is threshold strong, and
wherein the updated UE-capabilities report comprises an update of at least some of the plurality of the FGI bits in which the particular FGI bit has a second value indicating that the UE supports determining and reporting to the base station when neighboring coverage is threshold strong.

13. The method of claim 10,
wherein indicating that the UE does not support determining and reporting to the base station when neighboring coverage is threshold strong comprises indicating that the UE does not support event measurement reporting for one or more events selected from the group consisting of A3, A4 and A5, and
wherein indicating that the UE supports determining and reporting to the base station when neighboring coverage is threshold strong comprises indicating that the UE supports event measurement reporting for the one or more events.

14. The method of claim 10, further comprising:
responsive to the received updated capability report specifying that the UE supports determining and reporting to base station when neighboring coverage is threshold strong, the base station provisioning the UE with measurement gaps defining when the UE will tune away from the base station to measure neighboring coverage.

15. The method of claim 10, further comprising storing by the base station in a context record for the UE an indication of whether or not the UE supports measuring and reporting to the base station when neighboring coverage is threshold strong.

16. A method comprising:
operating a base station configured to serve user equipment devices (UEs); and
providing a UE configured to be served by the base station,
wherein the base station and UE are configured to engage in signaling with each other to establish a radio-link-layer connection, wherein the base station will serve the UE via an air interface,
wherein the UE is configured to transmit to the base station an initial UE-capabilities report indicating that the UE does not support determining and reporting to the base station when neighboring coverage is threshold strong, wherein, in response to the initial UE-capabilities report indicating that that the UE does not support determining and reporting to the base station when neighboring coverage is threshold strong, the base station does not yet provision the UE with a threshold with which to compare neighboring coverage,
wherein the UE is further configured to detect when coverage of the base station is threshold weak and, responsive to detecting when coverage of the base station is threshold weak, to transmit to the base station an updated UE-capabilities report indicating that the UE does support determining and reporting to the base station when neighboring coverage is threshold strong, and
wherein the base station is configured to respond to the updated UE-capabilities report indicating that the UE does support determining and reporting to the base station when neighboring coverage is threshold strong by provisioning the UE with the threshold with which to compare neighboring coverage.

17. The method of claim 16, wherein the UE and base station are configured to engage in an attachment process, and wherein the base station is configured to request the initial UE-capabilities report in association with the attachment process and the UE is configured to provide the initial UE-capabilities report in response to the request.

18. The method of claim 16,
wherein the initial UE-capabilities report comprises a plurality of feature-group-indicator (FGI) bits in which a particular FGI bit has a first value indicating that the UE does not support determining and reporting to the base station when neighboring coverage is threshold strong, and
wherein the updated UE-capabilities report comprises an update of at least some of the plurality of the FGI bits in which the particular FGI bit has a second value indicating that the UE supports determining and reporting to the base station when neighboring coverage is threshold strong.

19. The method of claim 16,
wherein indicating that the UE does not support determining and reporting to the base station when neighboring coverage is threshold strong comprises indicating that the UE does not support event measurement reporting for one or more events selected from the group consisting of A3, A4 and A5, and
wherein indicating that the UE supports determining and reporting to the base station when neighboring coverage is threshold strong comprises indicating that the UE supports event measurement reporting for the one or more measurement events.

20. The method of claim 16, wherein the UE provides wireless backhaul connectivity for a relay, and wherein the providing of the initial UE capabilities report indicating that the UE does not support determining and reporting to the base station when neighboring coverage is threshold strong is based at least in part on the UE providing wireless backhaul connectivity for the relay, whereby providing the initial UE capabilities report indicating that the UE does not support determining and reporting to the base station when neighboring coverage is threshold strong helps prevent the UE from handing over to a neighboring base station.

* * * * *